Aug. 18, 1959    J. ANDERSON ET AL    2,900,419
REACTION OF HALOCYCLOPENTADIENES WITH ACETYLENE
Filed Sept. 24, 1956
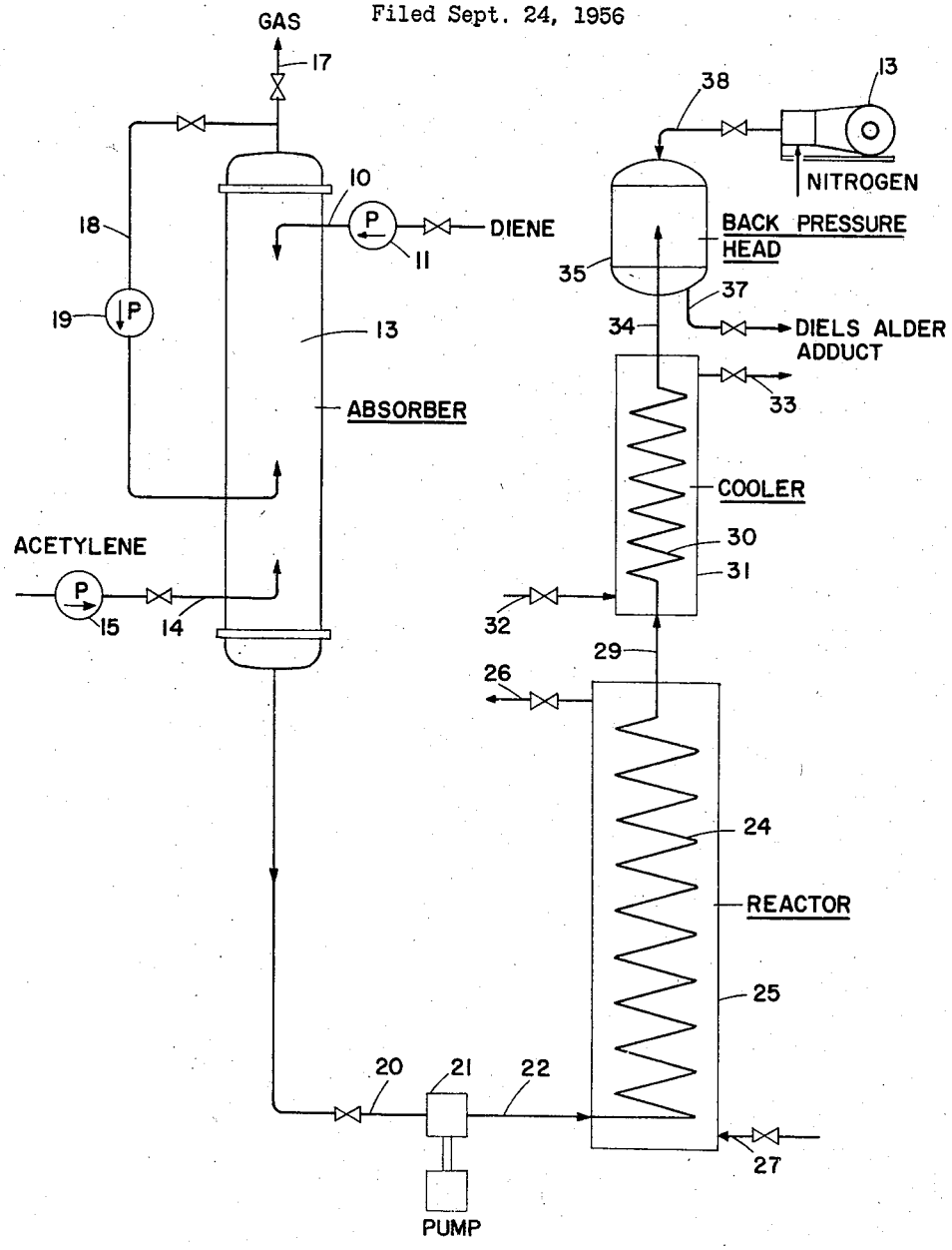
INVENTORS
JOHN ANDERSON
GEORGE F. JOHNSON
NORMAN W. HALL
BY *E. Walter Mark*
THEIR AGENT

2,900,419

REACTION OF HALOCYCLOPENTADIENES WITH ACETYLENE

John Anderson, San Pedro, Calif., and George F. Johnson, La Porte, and Norman W. Hall, Houston, Tex., assignors to Shell Development Company, New York, N.Y., a corporation of Delaware Application September 24, 1956, Serial No. 612,347

13 Claims. (Cl. 260—648)

This invention relates to an improved method for executing acetylene reactions at high pressures. The invention relates more particularly to the production of valuable unsaturated compounds by the direct non-catalytic liquid phase reaction of an acetylene with an unsaturated organic compound possessing a conjugated diene unsaturation. The invention relates still more particularly to the production of bicycloheptadienes and substituted bicycloheptadienes by the direct non-catalytic liquid phase reaction of acetylene with cyclopentadiene and/or substituted cyclopentadienes. A particular aspect of the invention relates to an improved process enabling the more efficient production of a normally liquid reaction product consisting essentially of 1,2,3,4,7,7-hexahalobicyclo-[2.2.1]-2,5-heptadiene from readily available starting materials comprising hexahalocyclopentadiene and acetylene.

The production of valuable higher boiling unsaturated compounds from available lower boiling unsaturated charge material by the direct reaction of the latter with acetylene has been disclosed heretofore. Methods disclosed heretofore, however, often prove to be highly impractical as a consequence of the hazardous nature of the acetylene reactant. The operation therein is generally necessarily limited to the use of conditions at which a specifically desired compound can either not be obtained in yields commensurate with practical scale operation and/or, if obtainable under such conditions, is often unsatisfactory with respect to purity, cost of production and ease of recovery. Conditions disclosed heretofore generally comprise, for example, the execution of the reaction in the unavoidable presence of substantial amounts of materials other than the reactants, added as solvents, gaseous diluents or the like.

It is therefore an object of the present invention to provide an improved process enabling the more efficient production of unsaturated organic compounds by the direct reaction of an acetylene with an unsaturated charge material possessing a conjugated diene unsaturation wherein the above difficulties are obviated to at least a substantial degree.

Another object of the invention is the provision of an improved process enabling the more efficient production of unsaturated cyclic organic compounds by the direct interaction of a cyclic diene and/or substituted cyclic diene with an acetylene.

Still another object of the invention is the provision of an improved process enabling the more efficient production of a bicycloheptadiene and/or a substituted bicycloheptadiene by the direct interaction of a cyclopentadiene and/or a substituted cyclopentadiene with acetylene.

Still another object of the invention is the provision of an improved process enabling the more efficient production of halo-substituted bicycloheptadiene by the direct interaction of halo-substituted cyclopentadiene with acetylene.

A more particular object of the invention is the provision of an improved process enabling the more efficient production of hexahalobicycloheptadiene by the direct interaction of hexahalo-substituted cyclopentadiene and acetylene.

A specific object of the invention is the provision of an improved process enabling the more efficient production of 1,2,3,4,7,7-hexachlorobicyclo[2.2.1]-2,5-heptadiene by the direct interaction of hexachlorocyclopentadiene and acetylene. Other objects and advantages of the invention will become apparent from the following detailed description thereof.

In accordance with the present invention acetylene reactions are executed with improved efficiency by dissolving acetylene while at a safe compression pressure, for example, a relative low pressure not exceeding about 500 p.s.i.g. and preferably not exceeding about 350 p.s.i.g., and while below reaction temperature, in a compound capable of reacting with acetylene and which is in the liquid state at said relatively low pressure at said temperature below reaction temperature; compressing the resulting solution to a high pressure which lies above the total vapor pressure of the reaction mixture at the reaction temperature without substantially increasing the temperature; and subjecting said solution while under said high pressure to reaction temperature in a liquid-full reaction zone; thereby effecting the interaction of acetylene with said compound in homogeneous liquid phase in the absence of any solvent other than said reactant compound.

In accordance with the process of the invention lower boiling unsaturated organic compounds possessing a conjugated diene unsaturation are converted to higher-boiling unsaturated compounds by reaction with an acetylene in a process which comprises dissolving acetylene in said lower boiling unsaturated organic compound in the liquid phase, compressing the resulting solution to a high pressure above the vapor pressure of said solution at the reaction temperature maintained in the reaction zone of the process, and passing said solution while at said high pressure through a liquid full reaction zone maintained at a reaction temperature effecting the interaction of said lower boiling unsaturated organic compound with said acetylene with the formation of reaction products comprising unsaturated organic compounds higher boiling than said lower boiling unsaturated charge.

Although the invention is applied to the reaction of acetylenic hydrocarbons with members of the broad class of organic unsaturated compounds possessing a conjugated unsaturation, it will be described in detail herein in its application to the production of a specific halo-substituted bicycloheptadiene from halo-substituted cyclopentadiene and acetylene. Reference will be had to the attached drawing wherein the single figure illustrates a more or less diagrammatic elevational view of one form of apparatus suitable for carrying out the invention.

1,2,3,4,7,7-hexachlorobicyclo[2.2.1]-2,5-heptadiene, efficiently produced in accordance with the present invention by interaction of hexachlorocyclopentadiene with acetylene, is a normally liquid product which has a boiling temperature of about 112° C. at 6 mm. Hg., and a freezing temperature of about 0° C. It is of importance as a starting or intermediate material in the production of valuable chemical derivatives therefrom. It is of particular value in the preparation of insecticides. Efforts to produce this valuable product directly from acetylene and hexachlorocyclopentadiene in accordance with methods disclosed heretofore have generally been unsuccessful. The extent to which these materials will interact and the nature of the products obtained are influenced markedly by variations in individual factors comprised in the operating conditions employed. At relatively mild conditions involving the use of low temperatures and pressures, interaction of these materials with the production of products in yields commensurate with practical scale operation will generally not take place even with prolonged contact time. The hazardous nature of the starting materials precludes the use, in methods disclosed heretofore, of exceedingly severe conditions of high temperature and pressures in the absence of safeguards capable of suppressing still further the formation of the desired reaction product. The use of relatively moderate conditions in such processes, although resulting in a certain amount of interaction between the reactants, generally results in a product which is in nowise the equivalent of the desired normal liquid reaction product consisting essentially of 1,2,3,4,7,7-hexachlorobicyclo[2.2.1]-2,5-heptadiene having a boiling temperature of about 112° C. at 6 mm. Hg.

In copending application Serial No. 527,633, filed August 10, 1955, now U.S. Patent No. 2,813,915, there is disclosed and claimed a process enabling the production of the desired reaction product with substantially improved yields by the interaction of acetylene with hexachlorocyclopentadiene under carefully controlled correlated conditions of temperature, pressure and contact time. It has now been found that the 1,2,3,4,7,7-hexachlorobicyclo[2.2.1]-2,5-heptadiene is obtained efficiently by effecting the interaction of acetylene with hexachlorocyclopentadiene under well defined conditions of high pressures in a homogeneous liquid reaction medium in accordance with the procedure of the present invention as defined herein.

Referring to the figure of the drawing, liquid halogen-substituted cyclopentadiene, for example, hexachlorocyclopentadiene, obtained from an outside source is forced through valved line 10 by means of pump 11 into a suitable acetylene absorption zone, for example, an absorption column 13. Acetylene from an outside source is forced through valved line 14 by means of pump 15 into absorber 13. Absorber 13 is optionally provided with suitable means assuring intimate contact of acetylene and the hexachlorocyclopentadiene. Such means comprise, for example, plates, baffles, grid trays, bubble cap trays, a bed of solid inert packing material, etc.

Although the acetylene absorption zone is depicted in the drawing as an absorption column it is to be understood that the invention is in nowise limited to the use of any specific type of apparatus as the absorption zone of the process. Thus, a zone comprising a column, coil, tube bundle, etc., or a plurality thereof arranged in parallel or series flow, or any other type of conventional equipment enabling intimate contact of acetylene with hexachlorocyclopentadiene therein, may be employed within the scope of the invention.

The pressure within absorber 13 is maintained at least sufficiently high to assure the presence of the hexachlorocyclopentadiene therein in the liquid state. Pressures exceeding those at which acetylene can safely be handled in the gaseous state, are, however, avoided. Pressures ranging upwards from atmospheric pressures may be employed within the scope of the invention. Pressures favorable to the solution of a maximum amount of acetylene in the hexahalocyclopentadiene within the absorption zone are, however, preferably employed. The maximum pressure safely employed will be governed to some extent by the specific type of absorber system employed. Pressures up to, for example, about 500 p.s.i.g., are comprised within the scope of the invention. It is preferred to maintain a pressure in absorber 13 in the range of, for example, from about 150 to about 350 pounds and preferably from about 250 to about 350 p.s.i.g. The temperature within absorber 13 is maintained sufficiently low to favor the absorption of a maximum amount of acetylene in the liquid hexachlorocyclopentadiene. Thus, low temperatures ranging, for example, from about −40° C, to temperatures above room temperature may suitably be employed within the absorber 13. However, it is preferred to maintain the temperature therein below about 50° C. Temperatures within absorber 13 preferably employed comprise those in the range of, for example, from about −40 to about 50° C. and still more preferably from about −20 to about 10° C. Lower temperatures may however be used within the scope of the invention. It has been found that with the maintenance of a pressure in the range of from about 250 to about 350 pounds, solutions of acetylene in hexahalocyclopentadiene containing from 45 up to as high as 55% acetylene on a molar basis are obtainable. Acetylene-absorption conditions are preferably controlled to obtain a solution of acetylene in hexachlorocyclopentadiene containing from 30 to 55 mol. percent, and preferably 40 to 55 mol. percent, of acetylene.

In a preferred method of carrying out the invention a high liquid level is maintained within absorber 13 and a gaseous stream comprising acetylene continuously introduced into the lower part thereof. The gaseous stream passes upward through the liquid resulting in the solution of acetylene in the hexachlorocyclopentadiene. Unabsorbed gas leaves the absorber 13 through valved line 17. A part or all of such gaseous stream passing through line 17 may be recycled through valved line 18, provided with pump 19, to the lower part of absorber 13.

Suitable means are provided for maintaining the desired temperature conditions within absorber 13. Thus absorber 13 may be provided with one or more such means as, for example, closed cooling coils, insulation, external cooling jackets, etc.

The hexachlorocyclopentadiene charged to the process of the invention may be obtained from any suitable source. It can be obtained for example by pyrolitic treatment of the octachlorocyclopentene-containing reaction products resulting from the chlorination of cyclopentadiene, as described and claimed in copending application Serial No. 190,194, filed October 14, 1950, now abandoned. The hexachlorocyclopentadiene charge need not be pure and may contain, for example, materials which are inert under the conditions of execution of the reaction. It is, however, preferably substantially free of any materials which are not readily separated from 1,2,3,4,7,7-hexachlorobicyclo-[2.2.1]-2,5-heptadiene or which otherwise render difficult the recovery of the desired reaction product.

In a preferred method of carrying out the process of the invention the acetylene introduced into absorber 13 is in relatively pure form. The presence therein of materials such as, for example, normally gaseous inert materials, as well as small amounts of impurities normally encountered in commercial acetylene, is comprised within the scope of the invention.

The hexachlorocyclopentadiene and/or acetylene charge to the process may be subjected to suitable pre-treating means to effect the removal of contaminants therefrom. Such pre-treating means may comprise, for example, contact with a suitable solid adsorbent such as silica, alumina, charcoal, ion exchange resins, etc. Inert gaseous material insoluble in hexachlorocyclopentadiene, for example, normally gaseous inert materials capable of facilitating the handling, including compression of acetylene, may be comprised in the acetylene charge to the process. Any such inert gases introduced into absorber 13 will leave the system through valved line 17.

Solution of acetylene in hexachlorocyclopentadiene is withdrawn from the lower part of absorber 13 and passed through valved line 20 to a suitable compressing means such as, for example, a pump 21. In passing through pump 21 the solution of acetylene in hexachlorocyclopentadiene is compressed to a pressure sufficiently high to assure the absence of any substantial amount of gaseous and/or vapor phase in any part of the subsequent reaction zone of the system. Thus the solution in passing through pump 21 is brought to a pressure exceeding the partial pressure of acetylene, and that of the total vapor pressure of said solution, at the temperature prevailing in the reaction zone.

Line 20 and pump 21 may be provided with suitable means to remove heat therefrom such as, for example, cooling jackets or other suitable cooling means. The solution of acetylene in hexachlorocyclopentadiene after compression to the high pressure is forced through line 22 into the reaction zone. A suitable reaction zone comprises a reactor enabling the passage of the acetylene-hexachlorocyclopentadiene therethrough in homogeneous liquid phase at the reaction temperature maintained therein. The reactor employed is preferably one wherein no back-mixing of the reaction mixture is encountered. A suitable type of reaction zone comprises one of restricted cross-sectional area such as, for example, an elongated externally heated coil 24. Although an elongated coil is shown in the illustrated description of the invention, it is to be understood that other suitable types of reaction zones of restricted cross sectional area comprising, for example, other tubular types of reactors may be employed. Although the use of reaction zones of restricted cross sectional area is preferred, other types of reaction zones comprising those of enlarged cross sectional area comprising, for example, pressure vessels, etc., may suitably be employed within the scope of the invention. A plurality of reactors arranged in series or parallel flow may suitably be employed.

In passing through coil 24 the hexachlorocyclopentadieneacetylene solution is maintained at a temperature sufficiently high to effect the interaction of the acetylene with hexachlorocyclopentadiene. Thus, the temperature within coil 24 may be maintained within the range of from about 75 to about 300° C. and preferably in the range of from about 125 to about 200° C. A particularly preferred temperature range comprises that in the range of from about 150 to about 175° C. Suitable means are provided for maintaining the contents of coil 24 at the desired reaction temperature. Thus, coil 24 may be housed in a suitable chamber 25 through which a fluid capable of introducing heat into the coil 24, such as, for example, steam, oil or the like may be passed. Valve lines 26 and 27 are provided for the introduction and withdrawal of the heat controlling fluid.

Essential to the attainment of the objects of the invention is the avoidance of any substantial vaporization of components of the reaction mixture within coil 24. Passage of the reaction mixture in homogeneous liquid phase through coil 24 is assured by the maintenance of a pressure therein above the partial pressure of the acetylene by means of pump 21. The hexachlorocyclopentadiene solution in passing through pump 21 is raised to a pressure sufficiently high to maintain the pressure within coil 24 above about 150 p.s.i.g. and preferably above about 2000 p.s.i.g. Although higher pressures may be employed a pressure in excess of about 6000 p.s.i.g. need generally not be exceeded. A preferred range comprises that from about 2000 to about 4000 p.s.i.g. Somewhat higher or lower pressures may, however, be used within the scope of the invention. The contact time preferably employed will vary in accordance with the specific conditions of temperature and pressure employed. A particular advantage of the invention resides in the relatively short reaction time required to obtain relatively high yields of the desired reaction product. A reaction time as short as, for example, about 0.25 hour is at times sufficient. Contact times in excess of, for example, about 10 hours need normally not be exceeded. In general a contact time of, for example, from about 0.5 to about 3 hours will be found satisfactory. Higher or lower contact times, however, may be employed within the scope of the invention.

Under the above-defined conditions acetylene and hexachlorocyclopentadiene will react within coil 24 with the formation of reaction products comprising 1,2,3,4,7,7-hexachlorobicyclo-[2.2.1]-2,5-heptadiene. The effluent stream from coil 24 is passed to suitable product recovery means.

Essential to the attainment of the objects of the invention is the maintenance of the reaction mixture in the homogeneous liquid phase while a reaction temperature. Accordingly, the effluent stream leaving coil 24 is subjected to suitable cooling means before being subjected to a reduction in pressure. Thus, effluence from coil 24 is passed through line 29 into suitable cooling means such as, for example, a cooling coil 30, the outer walls of which are in direct contact with a suitable cooling fluid maintained in a chamber 31. Valved lines 32 and 33 are provided for the passage of the cooling fluid through chamber 31. Suitable means aiding in the maintenance of the desired high pressure and homogeneous liquid state within coil 24 may optionally be provided. Such suitable means may comprise, for example, a back pressure head 35 into which line 34 discharges the cooled liquid stream leaving coil 30. The cooled liquid reactor effluence is drawn from the back pressure head 35 through valved line 37 and passed to suitable product recovery means. Uniform high pressure conditions within the reaction system are maintained by the maintenance of a nitrogen pressure on the back pressure head 35. To this effect a valve line 38 is provided through which a nitrogen pressure, kept at the reaction pressure by suitable compressing means, is maintained.

In a preferred method for carrying out the process of the invention, reaction of the acetylene with hexachlorocyclopentadiene under the high pressure conditions defined above is carried out in a plurality of stages; acetylene being absorbed in hexachlorocyclopentadiene and subjected to the high pressure homogeneous liquid phase reaction conditions defined hereinabove in the first stage of the plural-stage process. Reaction products from the first stage of the process are cooled and resaturated with acetylene at the low absorption pressure in the absorber of a second stage of the process; and the reaction mixture of the first stage thus resaturated with acetylene at low pressure is again subjected to the high pressure, homogeneous liquid phase reaction conditions defined hereinabove. The plural stage process of the invention may comprise, for example, from two to six or more such stages of high pressure, homogeneous liquid phase operation with saturation of the reaction mixture with acetylene at low pressure between each of the several stages. In general it has been found that four stages need not be exceeded to obtain substantially complete conversion of the hexachlorocyclopentadiene charge to a reaction mixture consisting essentially of 1,2,3,4,7,7-hexachlorobicyclo-[2.2.1]-2,5-heptadiene.

When carrying out the invention with stage-wise operation, it is preferred to limit the conversion in each of the stages to about 40 to 50% based upon hexachlorocyclopentadiene charged; the desired rate of conversion being readily obtained by control of reaction temperature and/or contact time. Temperature and pressure conditions need not necessarily be maintained uniform throughout the several stages of the operation. In a suitable method of out the stage-wise operation, a progressively increasing pressure gradient is maintained through the several stages of the process. Care is taken, however, to assure the presence of the reaction mixture in the homogeneous liquid phase throughout each of the reaction zones of the individual stages of the process.

The reaction mixture leaving the last stage of the process is passed to suitable product separating means. Such product separating means may comprise one or more such steps as, for example, distillation, extractive distillation, solvent extraction, selective adsorption, and the like. Unconverted charge may be recycled in part or entirely to either the acetylene absorption and/or reaction zone of the process.

Although the foregoing detailed description of the invention has stressed the production of 1,2,3,4,7,7-hexachlorobicyclo-[2.2.1]-2,5-heptadiene from hexachlorocyclopentadiene and acetylene the process of the invention is in no wise limited in its application to the execution of only this reaction. It may be applied to the reaction of a member of the broad class of unsaturated organic compounds possessing conjugated olefinic unsaturation with an acetylenic hydrocarbon. Diene hydrocarbons which may suitably be reacted with an acetylene in accordance with the invention comprise, for example, butadiene, 2-methyl butadiene, 2,3-dimethylbutadiene, cyclopentadienes, cyclohexadienes, alpha-terpinene, their homologues, etc. Acetylenic hydrocarbons which may be reacted with dienes in accordance with the process of the invention comprise compounds having the structure R—C≡C—R wherein R represents hydrogen or a hydrocarbyl radical, such as for example acetylene, methyl acetylene, dimethyl acetylene, ethyl acetylene, pentyne-2, methylbutyne-1, tert butyl acetylene, heptyne-1, etc.

Under the high pressure homogeneous liquid phase reaction conditions of the process the diene charge will react with the acetylenic hydrocarbon to form the Diels Alder addition compound. The invention is, however, applied with particular advantage to the production of the unsaturated compounds containing a bicyclo heptadiene group represented by bicyclo-[2.2.1]-2,5-heptadiene by the reaction of a cyclopentadiene with acetylene. Suitable cyclopentadiene charge comprises a substituted cyclopentadiene to thereby result in the obtaining of the correspondingly substituted bicyclo-heptadiene. Thus, the substituted cyclopentadiene charge may comprise the compounds obtained by substituting for at least one of the hydrogen atoms of the cyclopentadiene molecule a member of the group comprising, for example, hydrocarbyl groups, especially alkyl groups having from one to six carbon atoms to the molecule; halogen, including bromine, iodine, and chlorine; a member of the group —OR, —SR, —NR₂, and the like, wherein R represents a hydrocarbyl group such as an alkyl represented by methyl, ethyl, butyl and the like.

The process of the invention lends itself to execution in batch, continuous, or semi-continuous operation. Solvents which are inert under the conditions of execution of the reaction may be comprised in the charge to the system. Materials capable of inhibiting the polymerization of the reactants, or of the products of addition obtained, may be comprised in polymerization inhibiting amounts in the charge.

The following examples are presented to further illustrate the present invention without intent, however, to limit the scope of the invention claimed thereto.

EXAMPLE I

A stream of acetylene was passed countercurrent to liquid hexachlorocyclopentadiene in an absorption tower maintained at a pressure of 352 p.s.i.g. and a temperature of 3.5° C. thereby obtaining a solution of acetylene in hexachlorocycloheptadiene containing 40 mol percent of dissolved acetylene. The resulting solution was pressured to a pressure of 3700 p.s.i.g. and passed at this pressure through an externally heated nickel reaction coil maintained at a temperature of 165° C. The residence time employed was 0.55 hour. Reactor effluence was passed consecutively through an externally cooled cooling coil and a nitrogen-pressured back pressure dome before releasing the pressure thereon. The reactor employed was maintained liquid-full throughout the course of execution of the reaction. Analysis of the non-gaseous reaction mixture obtained showed the resulting mixture to consist of 39.1% by weight of normally liquid product boiling at about 112° C. at 6 mm. Hg having a freezing temperature of about 0° C. consisting of hexachlorobicycloheptadiene believed to have the general structure represented by the formula

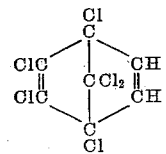

59.2% of unconverted hexachlorocyclopentadiene and about 0.5% by weight of by-products. The remaining 1.2% by weight of the reaction mixture was found to consist essentially of impurities originally present in the charge to the system. This represents a yield of 97.8% of the 1,2,3,4,7,7-hexachlorobicyclo-[2.2.1]-2,5-heptadiene based upon hexachlorocyclopentadiene converted.

EXAMPLE II 1,2,3,4,7,7-hexachlorobicyclo - [2.2.1] - 2,5-heptadiene was prepared by reacting acetylene with hexachlorocyclopentadiene at high pressure, in homogeneous liquid phase, in a three stage operation in accordance with the invention. Acetylene was brought into contact with hexachlorocyclopentadiene in a cooled absorber tower in a first stage of the process, thereby dissolving acetylene in hexachlorocyclopentadiene. The resulting solution was compressed to a pressure above 2000 p.s.i.g. and passed through a liquid-full, externally heated, nickel coil reactor maintained at the high pressure at reaction temperature. The resulting reaction mixture was cooled to about room temperature before pressure was reduced to acetylene absorption pressure. The resulting cooled reaction mixture was resaturated with acetylene and again subjected to the high pressure, homogeneous liquid phase reaction conditions in a second stage of the process. The reaction mixture from the second stage was cooled, saturated with acetylene in an absorber and subjected to the high pressure homogeneous liquid phase reaction conditions in a third stage of the process. Non-gaseous reaction mixture obtained in each stage of the operation was subjected to analysis. Operating conditions employed and results obtained for each stage of the operation are set forth in the following Table A.

Table A

| Stage | 1st | 2d | 3d |
|---|---|---|---|
| Absorber: | | | |
| Temp., ° C | 16 | 18 | 22 |
| Press., p.s.i.g | 300 | 315 | 312 |
| Reactor feed composition percent mole: | | | |
| Acetylene | 30 | 30 | 29 |
| Hexachlorocyclopentadiene | 70 | 43 | 22 |
| 1,2,3,4,7,7-hexachloro-bicyclo-[2.2.1]-2,5-heptadiene | 0 | 27 | 49 |
| Reactor: | | | |
| Temperature, ° C | 165 | 162 | 156 |
| Pressure, p.s.i.g | 2,150 | 2,150 | 2,150 |
| Residence time, hours | 1.0 | 1.5 | 2.2 |
| Reaction products composition, percent weight: | | | |
| 1,2,3,4,7,7-hexachloro-bicyclo-[2.2.1]-2,5-heptadiene | 36 | 73 | 86 |
| Hexachlorocyclopentadiene | 64 | 28 | 8 |
| By products | | .1 | .6 |
| Acetylene converted, percent | 80 | 72 | 53 |

EXAMPLE III

A reaction mixture consisting essentially of a normally liquid reaction product having a boiling temperature of about 112° C. at 6 mm. Hg. and consisting essentially of 1,2,3,4,7,7-hexachlorobicyclo-[2.2.1]-2,5-heptadiene was obtained by reacting hexachlorocyclopentadiene with acetylene in homogeneous liquid phase in a four stage high pressure operation in accordance with the invention. Acetylene was passed countercurrently to a stream of liquid hexachlorocyclopentadiene in a cooled tower absorber at 2° C. and a pressure of 315 p.s.i.g. in a first stage of the process. The resulting solution of acetylene in hexachlorocyclopentadiene was pressured to the high reaction pressure and passed through an externally heated nickel reaction coil. The reaction coil was maintained liquid-full throughout the course of the operation. The resulting reaction mixture was cooled before reducing the pressure thereon and charged to the second stage of the process. In the second stage of the process the reaction mixture emanating from the first stage was again saturated with acetylene at the low absorption pressure and temperature and subjected to the homogeneous liquid phase high pressure reaction conditions. Cooling of the reaction mixture from the previous stage, saturation of the cooled mixture with acetylene at the acetylene absorption conditions, repressuring and subjection to the homogeneous liquid phase high pressure reaction conditions was repeated in two additional stages, resulting in the passage of the reaction mixture through a total of four consecutive complete stages of acetylene absorption and high pressure reaction. The composition of the non-gaseous reaction mixture obtained after each stage of the process was determined by infrared spectrographic analysis. The conditions employed in each of these stages of the four stage operation and the results obtained are set forth in the following Table B.

Table B

| Stage | 1st | 2d | 3d | 4th |
|---|---|---|---|---|
| Absorber: | | | | |
| Temp., °C | 2 | −4 | −4 | −4 |
| Pressure, p.s.i.g | 315 | 294 | 293 | 315 |
| Acetylene in feed to reactor in mol., percent | 34 | 34 | 36 | 39 |
| Reactor: | | | | |
| Pressure, p.s.i.g | 3,900 | 3,900 | 3,900 | 3,900 |
| Temp., °C | 167 | 166 | 167 | 167 |
| Residence time, hours | 0.76 | 0.74 | 0.76 | 1.08 |
| Composition of nongaseous reactor effluence, wt. percent: | | | | |
| 1,2,3,4,7,7-hexachlorobicyclo-[2.2.1]-2,5-heptadiene | 41.2 | 64.6 | 80.5 | 87.8 |
| Unconverted hexachlorocyclopentadiene | 58.2 | 32.7 | 16.4 | 6.6 |
| By-products | 0.6 | 2.7 | 3.1 | 5.6 |
| Percent yield of 1,2,3,4,7,7-hexachlorobicyclo-[2.2.1]-2,5-heptadiene on hexachlorocyclopentadiene converted | 98.6 | 96.1 | 96.3 | 94.0 |

The 1,2,3,4,7,7-hexachlorobicyclo-[2.2.1]-2,5-heptadiene obtained was found to have a boiling temperature of about 112° C. at 6 mm. Hg and believed to possess the general structure represented by the formula

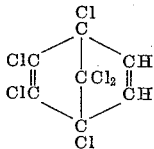

We claim as our invention:

1. The process for the production of a reaction mixture comprising a normally liquid reaction product having a boiling temperature of about 112° C. at 6 mm. Hg and consisting essentially of 1,2,3,4,7,7-hexachlorobicyclo-[2.2.1]-2,5-heptadiene, which comprises dissolving acetylene in liquid hexachlorocyclopentadiene at a temperature below about 50° C. at a pressure below about 500 p.s.i.g., compressing the resulting solution of acetylene in hexachlorocyclopentadiene to a high reaction pressure above about 1500 p.s.i.g. to maintain said solution in homogeneous liquid phase in the reaction zone of the process, and heating said solution while in homogeneous liquid phase and under said high reaction pressure in a liquid-full reaction zone at a temperature of from about 75 to about 300° C., thereby reacting acetylene with hexachlorocyclopentadiene in homogeneous liquid phase with the formation of a reaction mixture comprising a normally liquid reaction product having a boiling temperature of about 112° C. at 6 mm. Hg and consisting essentially of 1,2,3,4,7,7-hexachlorobicyclo-[2.2.1]-2,5-heptadiene in the absence of any substantial by-product formation.

2. The process in accordance with claim 1 wherein said acetylene is dissolved in said hexachlorocyclopentadiene at a temperature of from about −20 to about 10° C. and a pressure of from about 150 to about 350 p.s.i.g., and said reaction pressure is in the range of from about 2000 to about 6000 p.s.i.

3. The process substantially in accordance with claim 2 wherein said reaction temperature is in the range of from about 125 to about 200° C.

4. The process in accordance with claim 2 wherein acetylene is dissolved in said hexachlorocyclopentadiene to obtain a solution of acetylene in hexachlorocyclopentadiene containing from 30 to 50 mol percent acetylene.

5. The process for the production of a reaction mixture consisting essentially of a normally liquid reaction product having a boiling temperature of about 112° C. at 6 mm. Hg and consisting essentially of 1,2,3,4,7,7-hexachlorobicyclo-[2.2.1]-2,5-heptadiene, which comprises saturating hexachlorocyclopentadiene with acetylene at a temperature in the range of from about −40 to about 50° C. and a pressure below about 350 p.s.i.g., compressing said hexachlorocyclopentadiene saturated with acetylene to a pressure above about 2,000 p.s.i.g. to maintain said solution in homogeneous liquid phase in the reaction zone of the process, thereafter heating said compressed acetylene-containing hexachlorocyclopentadiene in homogeneous liquid phase at a pressure above about 2000 p.s.i.g. at a temperature of from about 125 to about 300° C.

6. The process for the production of 1,2,3,4,7,7-hexachlorobicyclo-[2.2.1]-2,5-heptadiene which comprises dissolving acetylene in liquid hexachlorocyclopentadiene at a temperature below about 50° C. and a pressure below about 350 p.s.i.g., compressing the resulting solution of acetylene in hexachlorocyclopentadiene to a high reaction pressure above about 2000 p.s.i.g., to maintain said solution in homogeneous liquid phase in the reaction zone of the process and heating said solution under said high pressure in a homogeneous liquid phase in a liquid-full reactor at a temperature of from about 75 to about 300° C., thereby reacting acetylene with hexachlorocyclopentadiene with the formation of reaction products consisting essentially of 1,2,3,4,7,7-hexachlorobicyclo-[2.2.1]-2,5-heptadiene in the absence of any substantial by-products formation.

7. The process for the production of 1,2,3,4,7,7-hexachlorobicyclo - [2.2.1]-2,5 - heptadiene which comprises dissolving acetylene in hexachlorocyclopentadiene at a temperature below about 50° C. and a pressure below about 350 p.s.i.g., compressing said solution of acetylene in hexachlorocyclopentadiene to a pressure in the range of from about 2,000 to about 6,000 p.s.i.g., and thereafter heating said solution of acetylene in hexachlorocyclopentadiene at a temperature of from about 125 to about 300° C. in homogeneous liquid state at a pressure in the range of from about 2000 to about 6000 p.s.i.g. thereby reacting acetylene with hexachlorocyclopentadiene with the formation of a reaction product consisting essentially of 1,2,3,4,7,7-hexachlorobicyclo-[2.2.1]-2,5-heptadiene in the absence of any substantial by-product formation.

8. The process for the production of 1,2,3,4,7,7-hexachlorobicyclo-[2.2.1]-2,5-heptadiene which comprises dissolving acetylene in hexachlorocyclopentadiene at a temperature below about 50° C. and a pressure below about 350 p.s.i.g., compressing said solution of acetylene in hexachlorocyclopentadiene to a high pressure above the partial pressure of acetylene at the reaction temperature prevailing in the reactor of the process, and thereafter heating said solution while in homogeneous liquid phase at a temperature of from about 125 to about 300° C. in a liquid-full reactor at a high pressure above the partial pressure of acetylene at said reaction temperature, thereby reacting acetylene with hexachlorocyclopentadiene with the formation of reaction products consisting essentially of 1,2,3,4,7,7-hexachlorobicyclo-[2.2.1]-2,5-heptadiene in the absence of any substantial by-products formation.

9. The process for the production of 1,2,3,4,7,7-hexachlorobicyclo-[2.2.1]-2,5-heptadiene which comprises dissolving acetylene in hexachlorocyclopentadiene at a temperature below about 50° C. and a pressure below about 350 p.s.i.g., compressing the resulting solution to a pressure above 1,500 p.s.i.g., thereafter heating said compressed solution of acetylene in hexachlorocyclopentadiene while in homogeneous liquid phase at a high reaction pressure in excess of about 1500 p.s.i.g. in a liquid-full reactor at a temperature of from about 125 to about 300° C., cooling the resulting reaction mixture to a temperature below about 50° C., dissolving acetylene in said cooled reaction mixture at a pressure below about 350 p.s.i.g., compressing said solution of acetylene in said reaction mixture to a pressure above about 1,500 p.s.i.g., and thereafter heating said solution of acetylene in said reaction mixture in homogeneous liquid phase in a liquid-full reactor at a high reaction pressure above about 1500 p.s.i.g. at a temperature of from about 125 to about 300° C., thereby reacting acetylene with hexachlorocyclopentadiene in the absence of any substantial by-product formation.

10. The process in accordance with claim 9 wherein the conversion hexachlorocyclopentadiene to 1,2,3,4,7,7-hexachlorobicyclo-[2.2.1]-2,5-heptadiene is limited to a maximum of from about 40% to 50%.

11. The process in accordance with claim 9 wherein solution of acetylene in said hexachlorocyclopentadiene and in said reaction mixture is effected at a temperature of from −40 to about 50° C. and said high reaction pressure is maintained in the range of from about 2000 to about 6000 p.s.i.g.

12. The process for the production of a reaction mixture comprising a chlorobicycloheptadiene which comprises dissolving acetylene in a chlorocyclopentadiene at a temperature below about 50° C. and a pressure below about 500 p.s.i.g., compressing the resulting solution to a high reaction pressure above the partial pressure of acetylene at the temperature prevailing in the reaction zone of the process, thereafter heating said solution while at said high reaction pressure in homogeneous liquid phase in a liquid-full reaction zone maintained at a temperature of from about 75 to about 300° C., thereby reacting acetylene with said chlorocyclopentadiene with the formation of a reaction mixture comprising chlorocyclopentadiene in the absence of any substantial by-product formation.

13. The process for the production of a reaction mixture comprising a halobicycloheptadiene which comprises dissolving acetylene in a halocyclopentadiene at a temperature below about 50° C. and at a pressure below about 500 p.s.i.g., compressing the resulting solution to a high reaction pressure above the partial pressure of acetylene at the temperature prevailing in the reaction zone of the process, thereafter heating said solution while at said high reaction pressure in homogeneous liquid phase in a liquid-full reaction zone maintained at a temperature of from about 75 to about 300° C., thereby reacting acetylene with said halocyclopentadiene with the formation of a reaction mixture comprising halocyclopentadiene in the absence of any substantial by-product formation.

References Cited in the file of this patent

UNITED STATES PATENTS

| 2,813,915 | Howald et al. | Nov. 19, 1957 |

FOREIGN PATENTS

| 498,176 | Belgium | Oct. 14, 1950 |